3,093,665
17β-PYRUVOYL-SUBSTITUTED PREGNENE DERIVATIVES

Eugene J. Agnello, Lyme, and Gerald D. Laubach, Niantic, Conn., assignors to Chas. Pfizer & Co., Inc., Brooklyn, N.Y., a corporation of Delaware No Drawing. Filed Jan. 22, 1960, Ser. No. 4,000
3 Claims. (Cl. 260—397.45)

This application is concerned with new and useful steroid compounds. More particularly it is concerned with certain steroids having adrenocortical activity characterized by having unique chemical features in the carbon atom side chain at the 17β-position. It is concerned also with a method of making these valuable compounds and with pharmaceutical compositions containing them together with pharmaceutically acceptable excipients.

This application is a continuation in part of previously filed patent applications Serial Nos. 764,265; 800,998 and 800,993, filed September 30, 1958; March 23, 1959, and March 23, 1959, now abandoned, respectively. It should be noted that the system of nomenclature used herein is different from that employed in the previous applications. It is believed that the present system is in more strict conformance with preferred practice.

The essence of this invention is the discovery that adrenocortically active steroids heretofore characterized by the presence of an α-hydroxy acetyl group at the 17β-position are also therapeutically useful when the α-hydroxy acetyl group is replaced with a 17β-pyruvoyl group.

Adrenocortically active steroids now constitute a well-defined class in the art, and include therapeutically active agents having a wide range of applications in the medical field. Cortisone, hydrocortisone, prednisone, prednisolone, 2-methyl-prednisolone, 6-methyl prednisolone, 16α-hydroxy prednisolone, 9α-fluoroprednisolone, 16α-methylprednisolone, 16 -methylprednisolone and others have been found to be useful as systemic and topical anti-inflammatory agents and for other medical uses. They have for example been used in the treatment of rheumatic diseases and allergies. They are pregnane derivatives having a cyclopentanopolyhydrophenanthrene nucleus. They generally have a double bond at the 4-position, a keto group at the 3-position and an oxygen function at the 11-position. Certain 9,11-dihalopregnene derivatives have adrenocoritcal activity.

The compounds of this invention may be represented by the formula:

R—M wherein R is a cyclopentanopolyhydrophenanthrene nucleus having adrenocortical activity when substituted at the 17β-position with an α-hydroxy acetyl group and M is a pyruvoyl group.

The preferred compounds within the purview of this invention include those having the formula:

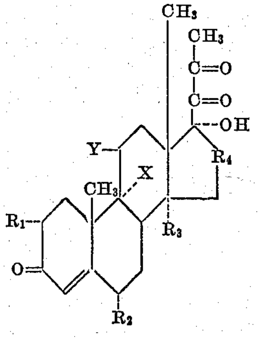

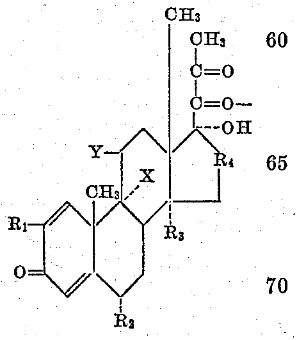

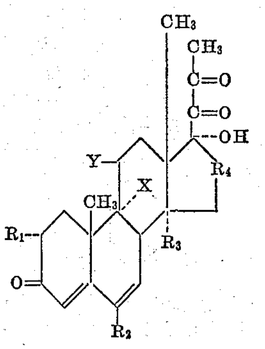

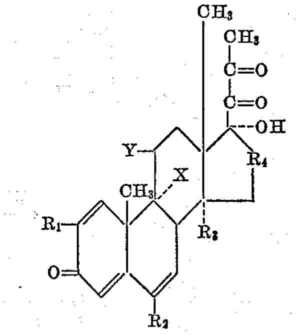

In the above structures, $R_1$ is hydrogen or methyl; $R_2$ is hydrogen, fluorine, chlorine or methyl; $R_3$ is hydrogen or hydroxyl and $R_4$ is

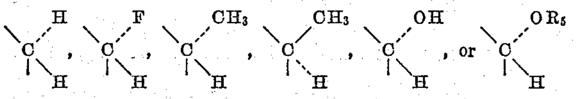

wherein $R_5$ is an acyl group containing only carbon, hydrogen and oxygen being derived from mono- or dicarboxylic acids containing up to ten carbon atoms. The water solubility of the compounds derived from dicarboxylic acids is enhanced by conversion to alkali metal or alkaline earth metal salts by reaction with a suitable base such as sodium carbonate or calcium hydroxide. These salts are included within the purview of this invention. In the above structures, X is hydrogen, α-halogen, α-methoxy, or α-ethoxy and Y is keto or β-hydroxyl. In the preferred compounds, represented above, the carbon atom at the 16-position is always substituted with at least one hydrogen and at least three of $R_1$, $R_2$, $R_3$, and the second substitutent on the number 16 carbon atom will always be hydrogen.

Starting compounds which are useful in the preparation of the valuable compounds of this invention include those having the formula:

R—Z wherein R has the same meaning as above and Z, which is located at the 17β-position is an α-hydroxy-β-chloro propanoyl group.

Starting compounds for the preparation of the preferred compounds of this invention include those having the same steroid nuclei as shown above with an α-hydroxy-β-chloro propanoyl group at the 17β-position. One of them, which is representative of all of them is shown in the following paragraph as Compound III.

The preparation of the valuable therapeutic agents of this invention is shown in the following reaction sequence. Although only the preparation of 21-methyl-$\Delta^4$-pregnene-11β,17α-diol-3,20,21-trione is shown, the synthesis is equally applicable to the preparation of the other compounds within the scope of the invention.

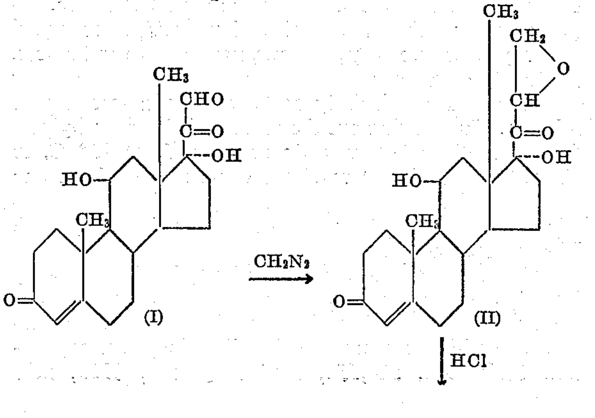

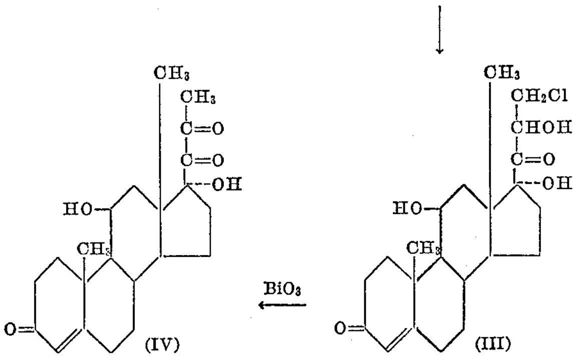

(IV) (III)

Parts of this sequence of reactions and certain of the intermediate products are described and claimed in copending and concurrently filed patent applications Serial Nos. 3,998, now Patent No. 3,031,375, and 3,999, now Patent No. 3,031,444.

The requisite aldehydes are prepared from the corresponding 21-hydroxylated compounds by reaction with cupric acetate as described in U.S. Patent 2,773,078, issued December 4, 1956.

The epoxide is prepared by reaction of the aldehyde with diazomethane in a reaction inert solvent at a temperature of from about 0° C. to about 25° C. for a period of from about 1 to about 24 hours.

The desired chlorohydrin is prepared by reaction of the epoxide with hydrogen chloride, preferably in equimolar quantities, in a reaction inert organic solvent at a temperature of from about −15° C. to about 30° C. for a period of from about 15 minutes to about 4 hours.

Examples I through III of this application more fully illustrate the preparation of the necessary starting materials.

Halogen and alkoxy groups are introduced at the 9-position using the procedure of Fried and Saho described in the Journal of the America Chemical Society, vol. 79, page 1130. This procedure involves dehydration of an 11-hydroxlated compound to give a $\Delta^{9,11}$-compound which is converted to a 9α,11β-bromohydrin by reaction with N-bromacetamide. This compound is dehydrohalogenated to a 9β,11β-epoxide with potassium acetate. The epoxide is then converted to the other halohydrins by reaction with a halogen acid or to an alkoxy compound by reaction with 72% perchloric acid in an alcohol.

Oxidation of an 11-hydroxyl group to a ketone is readily accomplished using, for example, chromium trioxide in acetic acid or the chromic acid-pyridine complex.

Double bonds are introduced at the 1:2-position using selenium dioxide as described more fully in patent application Serial No. 526,786, filed August 5, 1955, now abandoned. In this application, a method is described whereby a double bond is introduced at the 1,2-position of a $\Delta^4$-3-ketosteroid by contacting it with selenium dioxide in an inert organic solvent at an elevated temperature. Solvents which are useful for this reaction include, for example, tert-butanol, tert-pentanol, benzene, ethylene glycol diethers, such as dibutyl Cellosolve, dipropyl ether, ethylene glycol and various other glycol ethers, phenetole, xylene, dioxane, naphthalene and others. Preferred conditions include the addition of a lower aliphatic acid, particularly acetic acid to a tert-butanol mixture. In carrying out the reaction it is generally preferred to utilize temperatures of from about 75° C. to about 200° C. for from about one hour to about one hundred hours. Generally several molecular proportions of selenium dioxide are added during the reaction period. The application of this reaction to the preparation of the valuable compound of the instant invention is more fully illustrated in the appended examples.

Double bonds are introduced at the 6,7-position in accordance with the procedure described in patent application Serial No. 526,554, filed August 4, 1955, now abandoned. This application describes the preparation of $\Delta^6$-steroids by subjecting the $\Delta^4$-compound to treatment with quinone having an oxidation potential of less than −0.5 at a temperature between about 70° C. and 190° C. in an inert organic solvent including mononuclear aromatic hydrocarbon, mononuclear halogenated aromatic hydrocarbon, oxygenated polar aliphatic and polar alicyclic organic solvents.

In practicing the process of this invention, the selected chlorohydrin is treated with bismuth trioxide at a temperature of from 50° to 60° C. in a lower oxygenated aliphatic solvent, for example, an organic acid containing from two to four carbon atoms. The preferred solvent is acetic acid. Reaction is brought about by simply contacting the reactants in the selected solvent for a period of from about 2½ to about 4 hours. In preferred operations the reaction time is from 2½ to 3 hours. An excess of bismuth trioxide, say for example, from about 50% to about 300%, will ordinarily be used to ensure good yields. This is not necessary, however, since reaction will take place even though an excess of the chlorohydrin is used. Side reactions are minimized by maintaining the temperature within the 50° to 60° C. range.

Those skilled in the art will recognize that there are a number of methods whereby the product can be isolated at the end of the reaction period. In a preferred method the reaction mixture is filtered and the solvent removed in vacuo. A filter-aid may be employed to hasten the filtration step. The residue is then extracted with a hydrocarbon or halogenated hydrocarbon solvent containing up to seven carbon atoms, and washed successively with water, dilute base and again with water. It may be desirable to repeat each washing more than once. Suitable extraction solvents include chloroform, carbon tetrachloride, ethylene dichloride, hexane or benzene. A 5% to 10% aqueous solution of sodium bicarbonate provides a very satisfactory base although others such as aqueous sodium carbonate and potassium hydroxide can be used.

The product is isolated from the extraction solvent after drying by evaporation to dryness. Anhydrous sodium or magnesium sulfate are satisfactory drying agents. In some instances unreacted starting material may be recovered by interrupting the vacuum distillation and filtering after about 75% of the solvent has been removed. It is not necessary that this be done, but it of course makes the final product more economical to prepare. After all of the solvent has been removed the product which remains as a residue is purified by trituration with, for example, ethyl acetate.

It has been discovered that a small amount of 20,21-diketone can be recovered from the products formed during the reaction between a 21-aldehyde and diazomethane. The main product is of course the epoxide which is purified by trituration with ether. The ether dissolves the 20,21-diketone and this product can be recovered from the ether by evaporating the solution to dryness, taking up in 4:1 ether-ethyl acetate and chromatography over a magnesium silicate column. The column is eluted by passing effluents containing successively higher proportions of ether. The product is recovered by evaporating the eluent to dryness.

It will be noted by reference to the formulas representing the compounds of this invention that it is specifically intended to include within the purview of the instant invention a 16α-hydroxylated compound in which the hydroxyl group is esterified with an acyl hydrocarbon group containing up to ten carbon atoms. The term "acyl hydrocarbon" includes acyl hydrocarbon groups containing only carbon, hydrogen and oxygen derived from monocarboxylic or dicarboxylic acids. In the event that the acyl hydrocarbon group chosen is one derived from a dicarboxylic acid, it is often advantageous to treat an adrenocortically active compound with a base derived from an alkali metal or alkaline earth metal to prepare a metal salt. These bases include, for example, sodium, potassium, barium and calcium hydroxide as well as the corresponding carbonates and bicarbonates. Products so prepared are especially useful because of their increased solubility in water.

The 16α-hydroxyl group may be readily esterified by standard methods. It is well known that the 16α-hydroxyl group can be esterified without concomitant esterification of an 11β-hydroxyl group even though both hydroxyl groups are secondary hydroxyl groups. Although Fischer esterification and transesterification procedures may be employed, in general, it is preferred to form the esters by treatment with an acylating agent such as acyl halide or anhydride in the presence of a tertiary amine base such as pyridine or dimethylaniline.

Free alcohols are prepared from the corresponding esters by gentle hydrolysis, for example, with diluted hydrogen chloride in aqueous methanol or potassium carbonate in aqueous methanol.

The biologically active compounds of this invention may be administered alone or in combination with acceptable pharmaceutical carriers, the choice of which is determined by the preferred route of administration, the solubility of the compound and standard pharmaceutical practice. In general, the dosage of these compounds is of approximately the same order of magnitude as the dosage of hydrocortisone, and these compounds are useful to treat the types of pathological conditions often treated with hydrocortisone. Because of their great adrenocortical activity, it is sometimes possible to use dosages of these compounds which are lower than those of hydrocortisone.

For oral administration the compounds may be administered in the form of tablets containing excipients such as starch or milk sugar. Aqueous suspensions and elixirs which may be sweetened or flavored may also be used. To apply these therapeutic agents topically, they may be prepared in the form of ointments and salves in suitable bases especially non-aqueous petrolatum type bases. For intra-articular injection aqueous suspensions may be employed. In this case various suspending and wetting agents may be added to the compositions to obtain a suspension not tending to settle out easily or to pack down in the bottle in which it is stored. Intramuscular and subcutaneous dosage forms may also be prepared by standard pharmaceutical practice.

Besides being useful as therapeutic agents the compounds of this invention are also useful as intermediates in the preparation of certain 21-methyl-pregnene derivatives such as 21-methyl-$\Delta^{1,4}$-pregnadiene-11β,17α, 21-triol-3,20-dione which are also useful because of their adrenocortical activity. The compounds of this invention when reduced by the action of yeast in accordance with the process more fully described and claimed in copending and concurrently filed patent application Serial No. 3,996 gives the B-isomer of the 21-methyl compound.

The following examples are given solely for the purpose of illustration and are not to be construed as limitations of this invention, many apparent variations of which are possible without departing from the spirit or scope thereof.

EXAMPLE I

*9α-Fluoro-$\Delta^4$-Pregnene-11β,17α-Diol-3,20-Dione-21-Al*

A suspension of 500 mg. of 9α-fluoro-$\Delta^4$-pregnene-11β,17α,21-triol-3,20-dione, synthesized according to Fried's method, in 10 ml. of methanol was prepared and maintained at 60° C. while adding 750 mg. of cupric acetate partially dissolved in a mixture of 3 ml. of water and 12 ml. of methanol containing 3 drops of glacial acetic acid. The mixture was maintained at 60° C. for 30 minutes and the blue supernatant liquid decanted from the precipitated cuprous oxide. The blue solution was treated with 100 mg. of ethylenediamine tetraacetic acid and evaporated to a volume of about 4 ml. The moist residue was triturated with 20 ml. of water and filtered. The product was recovered as the monohydrate and converted to the non-hydrated form by heating at 135° C. at 0.5 mm. of mercury pressure for 24 hours.

This identical procedure was used to prepare the following compounds using the appropriate starting compounds. The list is given to avoid unnecessary repetition of experimental details. The 9-halo and alkoxy substituted compounds necessary for the preparation of these aldehydes were all prepared in accordance with Fried's method. The 11-keto compounds were prepared from the corresponding 11β-hydroxyl compounds by oxidation with chromium trioxide and acetic acid.

$\Delta^4$-pregnene-11β,17α,21-triol-3,20-dione-21-al
9α-chloro-$\Delta^4$-pregnene-11β,17α-diol-3,20-dione-21-al
9α-bromo-$\Delta^4$-pregnene-11β,17α-diol-3,20-dione-21-al
9α-iodo-$\Delta^4$-pregnene-11β,17α-diol-3,20-dione-21-al
9α-methoxy-$\Delta^4$-pregnene-11β,17α-diol-3,20-dione-21-al
9α-ethoxy-$\Delta^4$-pregnene-11β,17α-diol-3,20-dione-21-al
9α-fluoro-$\Delta^4$-pregnene-17α-ol-3,11,20-trione-21-al
9α-chloro-$\Delta^4$-pregnene-17α-ol-3,11,20-trione-21-al
9α-bromo-$\Delta^4$-pregnene-17α-ol-3,11,20-trione-21-al
9α-iodo-$\Delta^4$-pregnene-17α-ol-3,11,20-trione-21-al
9α-methoxy-$\Delta^4$-pregnene-17α-ol-3,11,20-trione-21-al
9α-ethoxy-$\Delta^4$-pregnene-17α-ol-3,11,20-trione-21-al
$\Delta^4$-pregnene-17α-ol-3,11,20-trione-21-al

EXAMPLE II

*17β-(2,3-Epoxido-Propionyl)-$\Delta^4$-Pregnene-11β,17α-Diol-3-One*

A solution was prepared containing 1 mmole of $\Delta^4$-pregnene-11β,17α-diol-3,20-dione-21-al monohydrate in 35 ml. of methanol containing 17.5 ml. of ether. To this solution there was added a diazomethane solution containing 4 mmoles of diazomethane in 17.5 ml. of ether. The solution was maintained at 0° C. for 24 hours and the solution evaporated in vacuo. The residue was triturated with ether and the crystalline product recovered by filtration.

The corresponding 9-halo and 9-alkoxy substituted compounds and the corresponding 11-ketone were similarly prepared.

EXAMPLE III

*21-Chloromethyl-$\Delta^4$-Pregnene-11β,17α,21-Triol-3-One*

A solution containing 500 mg. of 21-chloromethyl-$\Delta^4$-pregnene-11β,17α,21-triol-3-one in 50 ml. of ethanol was prepared and an ethanol solution containing a 300% molar excess of anhydrous hydrogen chloride was added. The solution was maintained at 5° C. for 3 hours. The product was recovered by filtration and recrystallized from ethyl acetate-chloroform.

The corresponding 21-hydroxymethyl compound was similarly prepared.

The corresponding 9-halo and 9-alkoxy substituted compounds and the corresponding 11-ketones were similarly prepared.

EXAMPLE IV

*21-Methyl-$\Delta^4$-Pregnene-11β,17α-Diol-3,20,21-Trione*

A total of 13 g. of the compound prepared in the previous example was taken up in 575 ml. of glacial acetic acid and 50.8 g. of bismuth trioxide was added. The mixture was maintained at 50 to 60° C. for 3 hours, filtered and the filtrate evaporated to a volume of 100 ml. The residue was extracted 3 times with 400 ml. portions of chloroform and the chloroform extracts washed successively with three 150 ml. portions of water. The organic solution was dried over anhydrous sodium sulfate and concentrated to a volume of 150 ml. The concentrate was filtered to remove 558 mg. of starting material and the filtrate was then evaporated to dryness.

The residue was triturated with ethyl acetate to give 6.7 g. of the desired product.

EXAMPLE V

*9α-Fluoro-21-Methyl-$\Delta^{1,4}$-Pregnadiene-11β,17α-Diol-3,20,21-Trione*

A mixture containing ten g. of 9α-fluoro-21-chloromethyl-$\Delta^{1,4}$-pregnadiene - 11β,17α,21-triol-3,20-dione in 600 ml. of propionic acid was prepared and 25 g. of bismuth trioxide was added. The mixture was maintained at 50 to 60° C. for 2½ hours, filtered and the filtrate evaporated to approximately 100 ml. The residue was extracted successively with two 400 ml. portions of ethylene dichloride, two 150 ml. portions of 2% sodium carbonate and four 150 ml. portions of water. The organic solution was dried over anhydrous magnesium sulfate and evaporated to dryness to yield the desired product. The product was recrystallized from ethyl acetate and melted at 216–220° C. (d.).

$\lambda_{max.}^{alc.}$=239 mμ (15,400), $[\alpha]_D$=+88 (dioxane)

*Analysis.*—Calcd. for $C_{22}H_{27}O_5F$: C, 67.67; H, 6.97. Found: C, 67.64; H, 6.91.

EXAMPLE VI

*21-Methyl-$\Delta^{1,4}$-Pregnadiene-11β,17α-Diol-3,20,21-Trione*

A mixture containing ten g. of 21-chloromethyl-$\Delta^{1,4}$-pregnadiene-11β,17α,21-triol-3,20-dione in 600 ml. of propionic acid was prepared and 25 g. of bismuth trioxide was added. The mixture was maintained at 50 to 60° C. for 2½ hours, filtered and the filtrate evaporated to approximately 100 ml. The residue was extracted successively with two 400 ml. portions of ethylene dichloride, two 150 ml. portions of 2% sodium carbonate and four 150 ml. portions of water. The organic solution was dried over anhydrous magnesium sulfate and evaporated to dryness to yield the desired product. The product was recrystallized from ethyl acetate and melted at 216–212° C., $\lambda_{max.}^{alc.}$=243 mμ (15,400), $[\alpha]_D$=+91 (dioxane)

*Analysis.*—Calcd. for $C_{22}H_{18}O_5$: C, 70.44; H, 7.58. Found: C, 71.18; H, 7.62.

EXAMPLE VII

*21-Methyl-$\Delta^{1,4,6}$-Pregnatriene-11β,17α-Diol-3,20,21-Trione*

A mixture containing ten g. of 21-chloromethyl-$\Delta^{1,4,6}$-pregnatriene-11β,17α,21-triol-3,20-dione in 600 ml. of propionic acid was prepared and 60 g. of bismuth trioxide was added. The mixture was maintained at 50 to 60° C. for 4 hours, filtered and the filtrate evaporated to approximately 100 ml. The residue was extracted successively with three 250 ml. portions of benzene, four 150 ml. portions of 5% sodium bicarbonate and six 100 ml. portions of water. The organic solution was dried over anhydrous sodium sulfate and evaporated to dryness to yield the desired product.

EXAMPLE VIII

*16-Methylene-21-Methyl-$\Delta^{4}$-Pregnene-11β,17α-Diol-3,20,21-Trione*

A total of 13 g. of 16-methylene-21-chloromethyl-$\Delta^{4}$-pregnene - 11β,17α,21 - triol - 3,20-dione prepared as described in copending and concurrently filed patent application Serial No. 3,998 was taken up in 575 ml. of glacial acetic acid and 50.8 g. of bismuth trixoide was added. The mixture was maintained at 50° to 60° C. for 3 hours, filtered and the filtrate evaporated to a volume of 100 ml. The residue was extracted 3 times with 400 ml. portions of chloroform and the chloroform extracts washed successively with three 150 ml. portions of water, six 150 ml. portions of 5% sodium bicarbonate and three 150 ml. portions of water. The organic solution was dried over anhydrous sodium sulfate and concentrated to a volume of 150 ml. A small amount of starting material was removed by filtration and the filtrate evaporated to dryness to give the desired product which was purified by trituration with ethyl acetate.

EXAMPLE IX

*16-Methylene-21-Methyl-$\Delta^{1,4}$-Pregnadiene-11β,17α-Diol-3,20,21-Triol*

A total of 13 g. of 16 methylene-21-chloromethyl-$\Delta^{1,4}$-pregnadiene-11β,17α,21-triol-3,20 - dione prepared as described in copending and concurrently filed patent application Serial No. 3,998 was taken up in 575 ml. of glacial acetic acid and 50.8 g. of bismuth trioxide was added. The mixture was maintained at 50° to 60° C. for 3 hours, filtered and the filtrate evaporated to a volume of 100 ml. The residue was extracted 3 times with 400 ml. portions of chloroform and the chloroform extracts washed successively with three 150 ml. portions of water. The organic solution was dried over anhydrous sodium sulfate and concentrated to a volume of 150 ml. A small amount of starting material was removed by filtration and the filtrate evaporated to dryness to give the desired product which was purified by trituration with ethyl acetate.

EXAMPLE X

*16-Methylene-21-Methyl-$\Delta^{4,6}$-Pregnadiene-11β,17α-Diol-3,20,21-Trione*

A total of 6.5 g. of 16-methylene-21-chloromethyl-$\Delta^{4,6}$-pregnadiene-11β,17α,21-triol-3,20-dione prepared as described in copending and concurrently filed patent application Serial No. 3,998 was taken up in 575 ml. of glacial acetic acid and 25.4 g. of bismuth trioxide was added. The mixture was maintained at 50° to 60° C. for 3 hours, filtered and the filtrate evaporated to a volume of 50 ml. The residue was extracted 3 times with 200 ml. portions of chloroform and the chloroform extracts washed successively with three 75 ml. portions of water, six 75 ml. portions of 5% sodium bicarbonate and three 75 ml. portions of water. The organic solution was dried over anyhdrous sodium sulfate and concentrated to a volume of 75 ml. A small amount of starting material was removed by filtration and the filtrate evaporated to dryness to give the desired product which was purified by trituration with ethyl acetate.

EXAMPLE XI

*16-Methylene-21-Methyl-$\Delta^{1,4,6}$-Pregnatriene-11β,17α-Diol-3,20,21-Trione*

A total of 6.5 g. of 16-methylene-21-chloromethyl-$\Delta^{1,4,6}$-pregnatriene-11β,17α,21-triol-3,20-dione prepared as described in copending and concurrently filed patent application Serial No. 3,998 was taken up in 575 ml. of glacial acetic acid and 25.4 g. of bismuth trioxide was added. The mixture was maintained at 50° to 60° C. for 3 hours, filtered and the filtrate evaporated to a volume of 50 ml. The residue was extracted 3 times with 200 ml. portions of chloroform and the chloroform extracts washed successively with three 75 ml. portions of water, six 75 ml. portions of 5% sodium bicarbonate and three 75 ml. portions of water. The organic solution was dried over anhydrous sodium sulfate and concentrated to a volume of 75 ml. A small amount of starting material was removed by filtration and the filtrate evaporated to dryness to give the desired product which was purified by trituration with ethyl acetate.

EXAMPLE XII

*16-Methylene-21-Methyl-$\Delta^{4}$-Pregnene-17α-Ol-3,11,20,21-Tetrone*

A total of 13 g. of 16-methylene-21-chloromethyl-$\Delta^{4}$-pregnene-17α,21-diol-3,11,20-trione prepared as described in copending and concurrently filed patent application Serial No. 3,998 was taken up in 575 ml. of glacial acetic acid and 50.8 g. of bismuth trioxide was added. The mixture was maintained at 50° to 60° C. for 3 hours, filtered and the filtrate evaporated to a volume of 100 ml. The residue was extracted 3 times with 400 ml. portions of chloroform and the chloroform extracts washed successively with three 150 ml. portions of water, six 150 ml. portions of 5% sodium bicarbonate and three 150 ml. portions of water. The organic solution was dried over anhydrous sodium sulfate and concentrated to a volume of 150 ml. A small amount of starting material was removed by filtration and the filtration evaporated to dryness to give the desired product which was purified by trituration with ethyl acetate.

EXAMPLE XIII

*16α-Fluoro-21-Methyl-$\Delta^4$-Pregnene-11β,17α-Diol-3,20,21-Trione*

A total of 13 g. of 16α-fluoro-21-chloromethyl-$\Delta^4$-pregnene-11β,17α,21-triol-3,20-dione prepared as described in copending and concurrently filed patent application Serial No. 3,998 was taken up in 575 ml. of glacial acetic acid and 50.8 g. of bismuth trioxide was added. The mixture was maintained at 50° to 60° C. for 3 hours, filtered and the filtrate evaporated to a volume of 100 ml. The residue was extracted 3 times with 400 ml. portions of chloroform and the chloroform extracts washed successively with three 150 ml. portions of water, six 150 ml. portions of 5% sodium bicarbonate and three 150 ml. portions of water. The organic solution was dried over anhydrous sodium sulfate and concentrated to a volume of 150 ml. A small amount of starting material was removed by filtration and the filtrate evaporated to dryness to give the desired product which was purified by trituration with ethyl acetate.

EXAMPLE XIV

*16α-Fluoro-21-Methyl-$\Delta^{1,4}$-Pregnadiene-11β,17α-Diol-3,20,21-Trione*

A total of 13 g. of 16α-fluoro-21-chloromethyl-$\Delta^{1,4}$-pregnadiene-11β,17α,21-triol-3,20-dione prepared as described in copending and concurrently filed patent application Serial No. 3,998 was taken up in 575 ml. of glacial acetic acid and 50.8 g. of bismuth trioxide was added. The mixture was maintained at 50° to 60° C. for 3 hours, filtered and the filtrate evaporated to a volume of 100 ml. The residue was extracted 3 times with 400 ml. portions of chloroform and the chloroform extracts washed successively with three 150 ml. portions of water. The organic solution was dried over anhydrous sodium sulfate and concentrated to a volume of 150 ml. A small amount of starting material was removed by filtration and the filtrate evaporated to dryness to give the desired product which was purified by trituration with ethyl acetate.

EXAMPLE XV

*16α-Fluoro-21-Methyl-$\Delta^{4,6}$-Pregnene-11β,17α-Diol-3,20,21-Trione*

A total of 6.5 g. of 16α-fluoro-21-chloromethyl-$\Delta^{4,6}$-pregnene - 11β,17α,21 - triol-3,20-dione prepared as described in copending and concurrently filed patent application Serial No. 3,998 was taken up in 575 ml. of glacial acetic acid and 25.4 g. of bismuth trioxide was added. The mixture was maintained at 50° to 60° C. for 3 hours, filtered and the filtrate evaporated to a volume of 50 ml. The residue was extracted 3 times with 200 ml. portions of chloroform and the chloroform extracts washed successively with three 75 ml. portions of water, six 75 ml. portions of 5% sodium bicarbonate and three 75 ml. portions of water. The organic solution was dried over anhydrous sodium sulfate and concentrated to a volume of 75 ml. A small amount of starting material was removed by filtration and the filtrate evaporated to dryness to give the desired product which was purified by trituration with ethyl acetate.

EXAMPLE XVI

*16α-Fluoro-21-Methyl-$\Delta^{1,4,6}$-Pregnatriene-11β,17α-Diol-3,20,21-Trione*

A total of 6.5 g. of 16α-fluoro-chloromethyl-$\Delta^{1,4,6}$-pregnatriene-11β,17α,21-triol-3,20-dione prepared as described in copending and concurrently filed patent application Serial No. 3,998 was taken up in 575 ml. of glacial acetic acid and 25.4 g. of bismuth trioxide was added. The mixture was maintained at 50° to 60° C. for 3 hours, filtered and the filtrate evaporated to a volume of 50 ml. The residue was extracted 3 times with 200 ml. portions of chloroform and the chloroform extracts washed successively with three 75 ml. portions of water, six 75 ml. portions of 5% sodium bicarbonate and three 75 ml. portions of water. The organic solution was dried over anhydrous sodium sulfate and concentrated to a volume of 75 ml. A small amount of starting material was removed by filtration and the filtrate evaported to dryness to give the desired product which was purified by trituration with ethyl acetate.

EXAMPLE XVII

*16α-Fluoro-21-Methyl-$\Delta^4$-Pregnene-17α-Ol-3,11,20,21-Tetrone*

A total of 13 g. of 16α-fluoro-21-chloromethyl-$\Delta^4$-pregnene-17α,21-diol-3,11-20-trione prepared as described in copending and concurrently filed patent application Serial No. 3,998 was taken up in 575 ml. of glacial acetic acid and 50.8 g. of bismuth trioxide was added. The mixture was maintained at 50° to 60° C. for 3 hours, filtered and the filtrate evaporated to a volume of 100 ml. The residue was extracted 3 times with 400 ml. portions of chloroform and the chloroform extracts washed successively with three 150 ml. portions of water. The organic solution was dried over anhydrous sodium sulfate and concentrated to a volume of 150 ml. A small amount of starting material was removed by filtration and the filtrate evaporated to dryness to give the desired product which was purified by trituration with ethyl acetate.

The following list is illustrative of the compounds within the purview of this invention prepared by the process of this invention. It is given to avoid unnecessary repetition of experimental details all of which are fully illustrated in the foregoing examples.

9α-fluoro-21-methyl-$\Delta^4$-pregnene-11β,17α-diol-3,20,21-trione
9α-chloro-21-methyl-$\Delta^4$-pregnene-11β,17α-diol-3,20,21-trione
9α-bromo-21-methyl-$\Delta^4$-pregnene-11β,17α-diol-3,20,21-trione
9α-iodo-21-methyl-$\Delta^4$-pregnene-11β,17α-diol-3,20,21-trione
9α-methoxy-21-methyl-$\Delta^4$-pregnene-11β,17α-diol-3,20,21-trione
9α-ethoxy-21-methyl-$\Delta^4$-pregnene-11β,17α-diol-3,20,21-trione 21-methyl-$\Delta^4$-pregnene-17α-ol-3,11,20,21-tetrone
9α-fluoro-21-methyl-$\Delta^4$-pregnene-17α-ol-3,11,20,21-tetrone
9α-chloro-21-methyl-$\Delta^4$-pregnene-17α-ol-3,11,20,21-tetrone
9α-bromo-21-methyl-$\Delta^4$-pregnene-17α-ol-3,11,20,21-tetrone
9α-iodo-21-methyl-$\Delta^4$-pregnene-17α-ol-3,11,20,21-tetrone
9α-methoxy-21-methyl-$\Delta^4$-pregnene-17α-ol-3,11,20,21-tetrone
9α-ethoxy-21-methyl-$\Delta^4$-pregnene-17α-ol-3,11,20,21-tetrone
2α,21-dimethyl-$\Delta^4$-pregnene-11β,17α-diol-3,20,21-trione
2α,21-dimethyl-9α-fluoro-$\Delta^4$-pregnene-11β,17α,diol-3,20,21-trione 2α,21-dimethyl-9α-chloro-$\Delta^4$-pregnene-11β,17α-diol-3,20,21-trione
2α,21-dimethyl-9α-bromo-$\Delta^4$-pregnene-11β,17α-diol-3,20,21-trione
2α,21-dimethyl-9α-iodo-$\Delta^4$-pregnene-11β,17α-diol-3,20,21-trione
2α,21-dimethyl-9α-methoxy-$\Delta^4$-pregnene-11β,17α-diol-3,20,21-trione
2α,21-dimethyl-9α-ethoxy-$\Delta^4$-pregnene-11β,17α,diol-3,20,21-trione 2α,21-dimethyl-$\Delta^4$-pregnene-17α-ol-3,11,20,21-tetrone
2α,21-dimethyl-9α-fluoro-$\Delta^4$-pregnene-17α-ol-3,11,20,21-tetrone
2α,21-dimethyl-9α-chloro-$\Delta^4$-pregnene-17α-ol-3,11,20,21-tetrone
2α,21-dimethyl-9α-bromo-$\Delta^4$-pregnene-17α-ol-3,11,20,21-tetrone
2α,21-dimethyl-9α-iodo-$\Delta^4$-pregnene-17α-ol-3,11,20,21-tetrone
2α,21-dimethyl-9α-methoxy-$\Delta^4$-pregnene-17α-ol-3,11,20,21-tetrone
2α,21-dimethyl-9α-ethoxy-$\Delta^4$-pregnene-17α-ol-3,11,20,21-tetrone 6α,21-dimethyl-$\Delta^4$-pregnene-11β,17α-diol-3,20,21-trione
6α,21-dimethyl-9α-fluoro-$\Delta^4$-pregnene-11β,17α-diol-3,20,21-trione
6α,21-dimethyl-9α-chloro-$\Delta^4$-pregnene-11β,17α-diol-3,20,21-trione
6α,21-dimethyl-9α-bromo-$\Delta^4$-pregnene-11β,17α-diol-3,20,21-trione
6α,21-dimethyl-9α-iodo-$\Delta^4$-pregnene-11β,17α-diol-3,20,21-trione
6α,21-dimethyl-9α-methoxy-$\Delta^4$-pregnene-11β,17α-diol-3,20,21-trione
6α,21-dimethyl-9α-ethoxy-$\Delta^4$-pregnene-11β,17α-diol-3,20,21-trione 6α,21-dimethyl-$\Delta^4$-pregnene-17α-ol-3,11,20,21-tetrone
6α,21-dimethyl-9α-fluoro-$\Delta^4$-pregnene-17α-ol-3,11,20,21-tetrone
6α,21-dimethyl-9α-chloro-$\Delta^4$-pregnene-17α-ol-3,11,20,21-tetrone
6α,21-dimethyl-9α-bromo-$\Delta^4$-pregnene-17α-ol-3,11,20,21-tetrone
6α,21-dimethyl-9α-iodo-$\Delta^4$-pregnene-17α-ol-3,11,20,21-tetrone
6α,21-dimethyl-9α-methoxy-$\Delta^4$-pregnene-17α-ol-3,11,20,21-tetrone
6α,21-dimethyl-9α-ethoxy-$\Delta^4$-pregnene-17α-ol-3,11,20,21-tetrone 21-methyl-$\Delta^4$-pregnene-14α,17α-diol-3,11,20,21-tetrone
9α-fluoro-21-methyl-$\Delta^4$-pregnene-14α,17α-diol-3,11,20,21-tetrone
9α-chloro-21-methyl-$\Delta^4$-pregnene-14α,17α-diol-3,11,20,21-tetrone
9α-bromo-21-methyl-$\Delta^4$-pregnene-14α,17α-diol-3,11,20,21-tetrone
9α-iodo-21-methyl-$\Delta^4$-pregnene-14α,17α-diol-3,11,20,21-tetrone
9α-methoxy-21-methyl-$\Delta^4$-pregnene-14α,17α-diol-3,11,20,21-tetrone
9α-ethoxy-21-methyl-$\Delta^4$-pregnene-14α,17α-diol-3,11,20,21-tetrone 21-methyl-$\Delta^4$-pregnene-11β,16α,17α-triol-3,20,21-trione
9α-fluoro-21-methyl-$\Delta^4$-pregnene-11β,16α,17α-triol-3,20,21-trione
9α-chloro-21-methyl-$\Delta^4$-pregnene-11β,16α,17α-triol-3,20,21-trione
9α-bromo-21-methyl-$\Delta^4$-pregnene-11β,16α,17α-triol-3,20,21-trione
9α-iodo-21-methyl-$\Delta^4$-pregnene-11β,16α,17α-triol-3,20,21-trione
9α-methoxy-21-methyl-$\Delta^4$-pregnene-11β,16α,17α-triol-3,20,21-trione
9α-ethoxy-21-methyl-$\Delta^4$-pregnene-11β,16α,17α-triol-3,20,21-trione 21-methyl-$\Delta^4$-pregnene-16α,17α-diol-3,11,20,21-tetrone
9α-fluoro-21-methyl-$\Delta^4$-pregnene-16α,17α-diol-3,11,20,21-tetrone
9α-chloro-21-methyl-$\Delta^4$-pregnene-16α,17α-diol-3,11,20,21-tetrone
9α-bromo-21-methyl-$\Delta^4$-pregnene-16α,17α-diol-3,11,20,21-tetrone
9α-iodo-21-methyl-$\Delta^4$-pregnene-16α,17α-diol-3,11,20,21-tetrone
9α-methoxy-21-methyl-$\Delta^4$-pregnene-16α,17α-diol-3,11,20,21-tetrone
9α-ethoxy-21-methyl-$\Delta^4$-pregnene-16α,17α-diol-3,11,20,21-tetrone 6α-fluoro-21-methyl-$\Delta^4$-pregnene-11β,17α-diol-3,20,21-trione
6α,9α-difluoro-21-methyl-$\Delta^4$-pregnene-11β,17α-diol-3,20,21-trione
6α-fluoro-9α-chloro-21-methyl-$\Delta^4$-pregnene-11β,17α-diol-3,20,21-trione
6α-fluoro-9α-bromo-21-methyl-$\Delta^4$-pregnene-11β,17α-diol-3,20,21-trione
6α-fluoro-9α-iodo-21-methyl-$\Delta^4$-pregnene-11β,17α-diol-3,20,21-trione
6α-fluoro-9α-methoxy-21-methyl-$\Delta^4$-pregnene-11β,17α-diol-3,20,21-trione
6α-fluoro-9α-ethoxy-21-methyl-$\Delta^4$-pregnene-11β,17α-diol-3,20,21-trione 6α-fluoro-21-methyl-$\Delta^4$-pregnene-17α-ol-3,11,20,21-tetrone
6α,9α-difluoro-21-methyl-$\Delta^4$-pregnene-17α-ol-3,11,20,21-tetrone
6α-fluoro-9α-chloro-21-methyl-$\Delta^4$-pregnene-17α-ol-3,11,20,21-tetrone
6α-fluoro-9α-bromo-21-methyl-$\Delta^4$-pregnene-17α-ol-3,11,20,21-tetrone
6α-fluoro-9α-iodo-21-methyl-$\Delta^4$-pregnene-17α-ol-3,11,20,21-tetrone
6α-fluoro-9α-methoxy-21-methoxy-$\Delta^4$-pregnene-17α-ol-3,11,20,21-tetrone
6α-fluoro-9α-ethoxy-21-methyl-$\Delta^4$-pregnene-17α-ol-3,11,20,21-tetrone 16α,21-dimethyl-$\Delta^4$-pregnene-11β,17α-diol-3,20,21-trione
16α,21-dimethyl-9α-fluoro-$\Delta^4$-pregnene-11β,17α-diol-3,20,21-trione
16α,21-dimethyl-9α-chloro-$\Delta^4$-pregnene-11β,17α-diol-3,20,21-trione
16α,21-dimethyl-9α-bromo-$\Delta^4$-pregnene-11β,17α-diol-3,20,21-trione
16α,21-dimethyl-9α-iodo-$\Delta^4$-pregnene-11β,17α-diol-3,20,21-trione
16α,21-dimethyl-9α-methoxy-$\Delta^4$-pregnene-11β,17α-diol-3,20,21-trione
16α,21-dimethyl19α-ethoxy-$\Delta^4$-pregnene-11β,17α-diol-3,20,21-trione 16α,21-dimethyl-$\Delta^4$-pregnene-17α-ol-3,11,20,21-tetrone
16α,21-dimethyl-9α-fluoro-$\Delta^4$-pregnene-17α-ol-3,11,20,21-tetrone
16α,21-dimethyl-9α-chloro-$\Delta^4$-pregnene-17α-ol-3,11,20,21-tetrone
16α,21-dimethyl-9α-bromo-$\Delta^4$-pregnene-17α-ol-3,11,20,21-tetrone
16α,21-dimethyl-9α-iodo-$\Delta^4$-pregnene-17α-ol-3,11,20,21-tetrone
16α,21-dimethyl-9α-methoxy-$\Delta^4$-pregnene-17α-ol-3,11,20,21-tetrone
16α,21-dimethyl-9α-ethoxy-$\Delta^4$-pregnene-17α-ol-3,11,20,21-tetrone 9α-fluoro-21-methyl-$\Delta^{1,4}$-pregnadiene-11β,17α-diol-3,20,21-trione
9α-chloro-21-methyl-$\Delta^{1,4}$-pregnadiene-11β,17α-diol-3,20,21-trione 9α-bromo-21-methyl-$\Delta^{1,4}$-pregnadiene-11β,17α-diol-3,20,21-trione 9α-iodo-21-methyl-$\Delta^{1,4}$-pregnadiene-11β,17α-diol-3,20,21-trione 9α-methoxy-21-methyl-$\Delta^{1,4}$-pregnadiene-11β,17α-diol-3,20,21-trione 9α-ethoxy-21-methyl-$\Delta^{1,4}$-pregnadiene-11β,17α-diol-3,20,21-trione 21-methyl-$\Delta^{1,4}$-pregnadiene-17α-ol-3,11,20,21-tetrone 9α-fluoro-21-methyl-$\Delta^{1,4}$-pregnadiene-17α-ol-3,11,20,21-tetrone 9α-chloro-21-methyl-$\Delta^{1,4}$-pregnadiene-17α-ol-3,11,20,21-tetrone 9α-bromo-21-methyl-$\Delta^{1,4}$-pregnadiene-17α-ol-3,11,20,21-tetrone 9α-iodo-21-methyl-$\Delta^{1,4}$-pregnadiene-17α-ol-3,11,20,21-tetrone lα-methoxy-21-methyl-$\Delta^{1,4}$-pregnadiene-17α-ol-3,11,20,21-tetrone 9α-ethoxy-21-methyl-$\Delta^{1,4}$-pregnadiene-17α-ol-3,11,20,21-tetrone 2,21-dimethyl-$\Delta^{1,4}$-pregnadiene-11β,17α-diol-3,20,21-trione 2,21-dimethyl-9α-fluoro-$\Delta^{1,4}$-pregnadiene-11β,17α-diol-3,20,21-trione 2,21-dimethyl-9α-chloro-$\Delta^{1,4}$-pregnadiene-11β,17α-diol-3,20,21-trione 2,21-dimethyl-9α-bromo-$\Delta^{1,4}$-pregnadiene-11β,17α-diol,3,20,21-trione 2,21-dimethyl-9α,iodo-$\Delta^{1,4}$-pregnadiene-11β,17α-diol-3,20,21-trione 2,21-dimethyl-9α-methoxy-$\Delta^{1,4}$-pregnadiene-11β,17α-diol-3,20,21-trione 2,21-dimethyl-9α-ethoxy-$\Delta^{1,4}$-pregnadiene-11β,17α-diol-diol-3,20,21-trione 2,21-dimethyl-$\Delta^{1,4}$-pregnadiene-17α-ol-3,11,20,21-tetrone 2,21-dimethyl-9α-fluoro-$\Delta^{1,4}$-pregnadiene-17α-ol,3,11,20,21-tetrone 2,21-dimethyl-9α-chloro-$\Delta^{1,4}$-pregnadiene-17α-ol,3,11,20,21-tetrone 2,21-dimethyl-9α-bromo-$\Delta^{1,4}$-pregnadiene-17α-ol-3,11,20,21-tetrone 2,21-dimethyl-9α-iodo-$\Delta^{1,4}$-pregnadiene-17α-ol-3,11,20,21-tetrone 2,21-dimethyl-9α-methoxy-$\Delta^{1,4}$-pregnadiene-17α-ol-3,11,20,21-tetrone 2,21-dimethyl-9α-ethoxy-$\Delta^{1,4}$-pregnadiene-17α-ol-3,11,20,21-tetrone 6α,21-dimethyl-$\Delta^{1,4}$-pregnadiene-11β,17α-diol-3,20,21-trione 6α,21-dimethyl-9α-fluoro-$\Delta^{1,4}$-pregnadiene-11β,17α-diol-3,20,21-trione 6α,21-dimethyl-9α-chloro-$\Delta^{1,1}$-pregnadiene-11β,17α-diol-3,20,21-trione 6α,21-dimethyl-9α-bromo-$\Delta^{1,4}$-pregnadiene-11β,17α-diol-3,20,21-trione 6α,21-dimethyl-9α,iodo-$\Delta^{1,4}$-pregnadiene-11β,17α-diol-3,20,21-trione 6α,21-dimethyl-9α-methoxy-$\Delta^{1,4}$-pregnadiene-11β,17α-diol-3,20,21-trione 6α,21-dimethyl-9α-ethoxy-$\Delta^{1,4}$-pregnadiene-11β,17α-diol-3,20,21-trione 6α,21-dimethyl-$\Delta^{1,4}$-pregnadiene-17α-ol-3,11,20,21-tetrone 6α,21-dimethyl-9α-fluoro-$\Delta^{1,4}$-pregnadiene-17α-ol-3,11,20,21-tetrone 6α,21-dimethyl-9α-chloro-$\Delta^{1,4}$-pregnadiene-17α-ol-3,11,20,21-tetrone 6α,21-dimethyl-9α-bromo-$\Delta^{1,4}$-pregnadiene-17α-ol-3,11,20,21-tetrone 6α,21-dimethyl-9α,iodo-$\Delta^{1,4}$-pregnadiene-17α-ol-3,11,20,21-tetrone 6α,21-dimethyl-9α-methoxy-$\Delta^{1,4}$-pregnadiene-17α-ol-3,11,20,21-tetrone 6α,21-dimethyl-9α-ethoxy-$\Delta^{1,4}$-pregnadiene-17α-ol-3,11,20,21-tetrone 21-methyl-$\Delta^{1,4}$-pregnadiene-11β,14α,17α-triol-3,20,21-trione 9α-fluoro-21-methyl-$\Delta^{1,4}$-pregnadiene-11β,14α,17α-triol-3,20,21-trione 9α-chloro-21-methyl-$\Delta^{1,4}$-pregnadiene-11β,14α,17α-triol-3,20,21-trione 9α-bromo-21-methyl-$\Delta^{1,4}$-pregnadiene-11β,14α,17α-triol-3,20,21-trione 9α-iodo-21-methyl-$\Delta^{1,4}$-pregnadiene-11β,14α,17α-triol-3,20,21-trione 9α-methoxy-21-methyl-$\Delta^{1,4}$-pregnadiene-11β,14α,17α-triol-3,20,21-trione 9α-ethoxy-21-methyl-$\Delta^{1,4}$-pregnadiene-11β,14α,17α-triol-3,20,21-trione 21-methyl-$\Delta^{1,4}$-pregnadiene-14α,17α-diol-3,11,20,21-tetrone 9α-fluoro-21-methyl-$\Delta^{1,4}$-pregnadiene-14α,17α-diol-3,11,20,21-tetrone 9α-chloro-21-methyl-$\Delta^{1,4}$-pregnadiene-14α,17α-diol-3,11,20,21-tetrone 9α-bromo-21-methyl-$\Delta^{1,4}$-pregnadiene-14α,17α-diol-3,11,20,21-tetrone 9α-iodo-21-methyl-$\Delta^{1,4}$-pregnadiene-14α,17α-diol-3,11,20,21-tetrone 9α-methoxy-21-methyl-$\Delta^{1,4}$-pregnadiene-14α,17α-diol-3,11,20,21-tetrone 9α-ethoxy-21-methyl-$\Delta^{1,4}$-pregnadiene-14α,17α-diol-3,11,20,21-tetrone 21-methyl-$\Delta^{1,4}$-pregnadiene-11β,16α,17α-triol-3,20,21-trione 9α-fluoro-21-methyl-$\Delta^{1,4}$-pregnadiene-11β,16α,17α-triol-3,20,21-trione 9α-chloro-21-methyl-$\Delta^{1,4}$-pregnadiene-11β,16α,17α-triol-3,20,21-trione 9α-bromo-21-methyl-$\Delta^{1,4}$-pregnadiene-11β,16α,17α-triol-3,20,21-trione 9α-iodo-21-methyl-$\Delta^{1,4}$-pregnadiene-11β,16α,17α-triol-3,20,21-trione 9α-methoxy-21-methyl-$\Delta^{1,4}$-pregnadiene-11β,16α,17α-triole13,20,21-trione 9α-ethoxy-21-methyl-$\Delta^{1,4}$-pregnadiene-11β,16α,17α-triol-3,20,21-trione 21-methyl-$\Delta^{1,4}$-pregnadiene-16α,17α-diol-3,11,20,21-tetrone 9α-fluoro-21-methyl-$\Delta^{1,4}$-pregnadiene-16α,17α-diol-3,11,20,21-tetrone 9α-chloro-21-methyl-$\Delta^{1,4}$-pregnadiene-16α,17α-diol-3,11,20,21-tetrone 9α-bromo-21-methyl-$\Delta^{1,4}$-pregnadiene-16α,17α-diol-3,11,20,21-tetrone 9α-iodo-21-methyl-$\Delta^{1,4}$-pregnadiene-16α,17α-diol-3,11,20,21-tetrone 9α-methoxy-21-methyl-$\Delta^{1,4}$-pregnadiene-16α, 17α-diol-3,11,20,21-tetrone 9α-ethoxy-21-methyl-$\Delta^{1,4}$-pregnadiene-16α,17α-diol-3,11,20,21-tetrone 6α-fluoro-21-methyl-$\Delta^{1,4}$-pregnadiene-11β,17α-diol-3,20,21-trione 6α,9α-difluoro-21-methyl-$\Delta^{1,4}$-pregnadiene-11β,17α-diol-3,20,21-trione 6α-fluoro-9α-chloro-21-methyl-$\Delta^{1,4}$-pregnadiene-11β,17α-diol-3,20,21-trione 6α-fluoro-9α-bromo-21-methyl-$\Delta^{1,4}$-pregnadiene-11β,17α-diol-3,20,21-trione 6α-fluoro-9α-iodo-21-methyl-$\Delta^{1,4}$-pregnadiene-11β,17α-diol-3,20,21-trione 6α-fluoro-9α-methoxy-21-methyl-$\Delta^{1,4}$-pregnadiene-11β,17α-diol-3,20,21-trione 6α-fluoro-9α-ethoxy-21-methyl-$\Delta^{1,4}$-pregnadiene-11β,17α-diol-3,20,21-trione 6α-fluoro-21-methyl-$\Delta^{1,4}$-pregnadiene-17α-ol-3,11,20,21-tetrone
6α,9α-difluoro-21-methyl-$\Delta^{1,4}$-pregnadiene-17α-ol-3,11,20,21-tetrone
6α-fluoro-9α-chloro-21-methyl-$\Delta^{1,4}$-pregnadiene-17α-ol-3,11,20,21-tetrone
6α-fluoro-9α-bromo-21-methyl-$\Delta^{1,4}$-pregnadiene-17α-ol-3,11,20,21-tetrone
6α-fluoro-9α-iodo-21-methyl-$\Delta^{1,4}$-pregnadiene-17α-ol-3,11,20,21-tetrone
6α-fluoro-9α-methoxy-21-methyl-$\Delta^{1,4}$-pregnadiene-17α-ol-3,11,20,21-tetrone
6α-fluoro-9α-ethoxy-21-methyl-$\Delta^{1,4}$-pregnadiene-17α-ol-3,11,20,21-tetrone 16α,21-dimethyl-$\Delta^{1,4}$-pregnadiene-11β,17α-diol-3,20,21-trione
16α,21-dimethyl-9α-fluoro-$\Delta^{1,4}$-pregnadiene-11β,17α-diol-3,20,21-trione
16α,21-dimethyl-9α-chloro-$\Delta^{1,4}$-pregnadiene-1β,17α-diol-3,20,21-trione
16α,21-dimethyl-9α-bromo-$\Delta^{1,4}$-pregnadiene-11β,17α-diol-3,20,21-trione
16α,21-dimethyl-9α-iodo-$\Delta^{1,4}$-pregnadiene-11β,17α-diol-3,20,21-trione
16α,21-dimethyl-9α-methoxy-$\Delta^{1,4}$-pregnadiene-11β,17α-diol-3,20,21-trione
16α,21-dimethyl-9α-ethoxy-$\Delta^{1,4}$-pregnadiene-11β,17α-diol-3,20,21-trione 16α,21-dimethyl-$\Delta^{1,4}$-pregnadiene-17α-ol-3,11,20,21-tetrone
16α,21-dimethyl-9α-fluoro-$\Delta^{1,4}$-pregnadiene-17α-ol-3,11,20,21-tetrone
16α,21-dimethyl-9α-chloro-$\Delta^{1,4}$-pregnadiene-17α-ol-3,11,20,21-tetrone
16α,21-dimethyl-9α-bromo-$\Delta^{1,4}$-pregnadiene-17α-ol-3,11,20,21-tetrone
16α,21-dimethyl-9α-iodo-$\Delta^{1,4}$-pregnadiene-17α-ol-3,11,20,21-tetrone
16α-21-dimethyl-9α-methoxy-$\Delta^{1,4}$-pregnadiene-17α-ol-3,11,20,21-tetrone
16α,21-dimethyl-9α-ethoxy-$\Delta^{1,4}$-pregnadiene-17α-ol-3,11,20,21-tetrone 21-methyl-$\Delta^{4,6}$-pregnadiene-11β,17α-ol-3,20-21-trione
9α-fluoro-21-methyl-$\Delta^{4,6}$-pregnadiene-11β,17α-ol-3,20,21-trione
9α-chloro-21-methyl $\Delta^{4,6}$-pregnadiene-11β,17α-ol-3,20,21-trione
9α-bromo-21-methyl-$\Delta^{4,6}$-pregnadiene-11β,17α-ol-3,20,21-trione
9α-iodo-21-methyl-$\Delta^{4,6}$-pregnadiene-11β,17α-ol-3,20,21-trione
9α-methoxy-21-methyl-$\Delta^{4,6}$-pregnadiene-11β,17α-ol-3,20,21-trione
9α-ethoxy-21-methyl-$\Delta^{4,6}$-pregnadiene-11β,17α-ol-3,20,21-trione 21-methyl-$\Delta^{4,6}$-pregnadiene-17α-ol-3,11,20,21-tetrone
9α-fluoro-21-methyl-$\Delta^{4,6}$-pregnadiene-17α-ol-3,11,20,21-tetrone
9α-chloro-21-methyl-$\Delta^{4,6}$-pregnadiene-17α-ol-3,11,20,21-tetrone
9α-bromo-21-methyl-$\Delta^{4,6}$-pregnadiene-17α-ol-3,11,20,21-tetrone
9α-iodo-21-methyl-$\Delta^{4,6}$-pregnadiene-17α-ol-3,11,20,21-tetrone
9α-methoxy-21-methyl-$\Delta^{4,6}$-pregnadiene-17α-ol-3,11,20,21-tetrone
9α-ethoxy-21-methyl-$\Delta^{4,6}$-pregnadiene-17α-ol-3,11,20,21-tetrone 2α,21-dimethyl-$\Delta^{4,6}$-pregnadiene-11β,17α-diol-3,20,21-trione
2α,21-dimethyl-9α-fluoro-$\Delta^{4,6}$-pregnadiene-11β,17α-diol-3,20,21-trione
2α,21-dimethyl-9α-chloro-$\Delta^{4,6}$-pregnadiene-11β,17α-diol-3,20,21-trione
2α,21-dimethyl-9α-bromo-$\Delta^{4,6}$-pregnadiene-11β,17α-diol-3,20,21-trione
2α,21-dimethyl-9α-iodo-$\Delta^{4,6}$-pregnadiene-11β,17α-diol-3,20,21-trione
2α,21-dimethyl-9α-methoxy-$\Delta^{4,6}$-pregnadiene-11β,17α-diol-3,20,21-trione
2α,21-dimethyl-9α-ethoxy-$\Delta^{4,6}$-pregnadiene-11β,17α-diol-3,20,21-trione
2α,21-dimethyl-$\Delta^{4,6}$-pregnadiene-17α-ol-3,11,20,21-tetrone
2α,21-dimethyl-9α-fluoro-$\Delta^{4,6}$-pregnadiene-17α-ol-3,11,20,21-tetrone
2α,21-dimethyl-9α-chloro-$\Delta^{4,6}$-pregnadiene-17α-ol-3,11,20,21-tetrone
2α,21-dimethyl-9α-bromo-$\Delta^{4,6}$-pregnadiene-17α-ol-3,11,20,21-tetrone
2α,21-dimethyl-9α-bromo-$\Delta^{4,6}$-pregnadiene-17α-ol-3,11,20,21-tetrone
2α,21-dimethyl-9α-iodo-$\Delta^{4,6}$-pregnadiene-17α-ol-3,11,20,21-tetrone
2α,21-dimethyl-9α-methoxy-$\Delta^{4,6}$-pregnadiene-17α-ol-3,11,20,21-tetrone
2α,21-dimethyl-9α-ethoxy-$\Delta^{4,6}$-pregnadiene-17α-ol-3,11,20,21-tetrone 6,21-dimethyl-$\Delta^{4,6}$-pregnadiene-11β,17α-diol-3,20,21-trione
6,21-dimethyl-9α-fluoro-$\Delta^{4,6}$-pregnadiene-11β,17α-diol-3,20,21-trione
6,20-dimethyl-9α-chloro-$\Delta^{4,6}$-pregnadiene-11β,17α-diol-3,20,21-trione
6,21-dimethyl-9α-bromo-$\Delta^{4,6}$-pregnadiene-11β,17α-diol-3,20,21-trione
6,21-dimethyl-9α-iodo-$\Delta^{4,6}$-pregnadiene-11β,17α-diol-3,20,21-trione
6,21-dimethyl-9α-methoxy-$\Delta^{4,6}$-pregnadiene-11β,17α-diol-3,20,21-trione
6,21-dimethyl-9α-ethoxy-$\Delta^{4,6}$-pregnadiene-11β,17α-diol-3,20,21-trione 6,21-dimethyl-$\Delta^{4,6}$-pregnadiene-17α-ol-3,11,20,21-tetrone
6,21-dimethyl-9α-fluoro-$\Delta^{4,6}$-pregnadiene-17α-ol-3,11,20,21-tetrone
6,21-dimethyl-9α-chloro-$\Delta^{4,6}$-pregnadiene-17α-ol-3,11,20,21-tetrone
6,21-dimethyl-9α-bromo-$\Delta^{4,6}$-pregnadiene-17α-ol-3,11,20,21-tetrone
6,21-dimethyl-9α-iodo-$\Delta^{4,6}$-pregnadiene-17α-ol-3,11,20,21-tetrone
6,21-dimethyl-9α-methoxy-$\Delta^{4,6}$-pregnadiene-17α-ol-3,11,20,21-tetrone
6,21-dimethyl-9α-ethoxy-$\Delta^{4,6}$-pregnadiene-17α-ol-3,11,20,21-tetrone 21-methyl-$\Delta^{4,6}$-pregnadiene-11β,14α,17α-triol-3,20,21-trione
9α-fluoro-21-methyl-$\Delta^{4,6}$-pregnadiene-11β,14α,17α-triol-3,20,21-trione
9α-chloro-21-methyl-$\Delta^{4,6}$-pregnadiene-11β,14α,17α-triol-3,20,21-trione
9α-bromo-21-methyl-$\Delta^{4,6}$-pregnadiene-11β,14α,17α-triol-3,20,21-trione
9α-iodo-21-methyl-$\Delta^{4,6}$-pregnadiene-11β,14α,17α-triol-3,20,21-trione
9α-methoxy-21-methyl-$\Delta^{4,6}$-pregnadiene-11β,14α,17α-triol-3,20,21-trione
9α-ethoxy-21-methyl-$\Delta^{4,6}$-pregnadiene-11β,14α,17α-triol-3,20,21-trione 21-methyl-$\Delta^{4,6}$-pregnadiene-14α,17α-diol-3,11,20,21-tetrone 9α-fluoro-21-methyl-$\Delta^{4,6}$-pregnadiene-14α,17α-diol-3,11,20,21-tetrone 9α-chloro-21-methyl-$\Delta^{4,6}$-pregnadiene-14α,17α-diol-3,11,20,21-tetrone 9α-bromo-21-methyl-$\Delta^{4,6}$-pregnadiene-14α,17α-diol-3,11,20,21-tetrone 9α-iodo-21-methyl-$\Delta^{4,6}$-pregnadiene-14α,17α-diol-3,11,20,21-tetrone 9α-methoxy-21-methyl-$\Delta^{4,6}$-pregnadiene-14α,17α-diol-3,11,20,21-tetrone 9α-ethoxy-21-methyl-$\Delta^{4,6}$-pregnadiene-14α,17α-diol-3,11,20,21-tetrone 21-methyl-$\Delta^{4,6}$-pregnadiene-11β,16α,17α-triol-3,20,21-trione 9α-fluoro-21-methyl-$\Delta^{4,6}$-pregnadiene-11β,16α,17α-triol-3,20,21-trione 9α-chloro-21-methyl-$\Delta^{4,6}$-pregnadiene-11β,16α,17α-triol-3,20,21-trione 9α-bromo-21-methyl-$\Delta^{4,6}$-pregnadiene-11β,16α,17α-triol-3,20,21-trione 9α-iodo-21-methyl-$\Delta^{4,6}$-pregnadiene-11β,16α,17α-triol-3,20,21-trione 9α-methoxy-21-methyl-$\Delta^{4,6}$-pregnadiene-11β,16α17α-triol-3,20,21-trione 9α-ethoxy-21-methyl-$\Delta^{4,6}$-pregnadiene-11β,16α,17α-triol-3,20,21-trione 21-methyl-$\Delta^{4,6}$-pregnadiene-16α,17α-diol-3,11,20,21-tetrone 9α-fluoro-21-methyl-$\Delta^{4,6}$-pregnadiene-16α,17α-diol-3,11,20,21-tetrone 9α-chloro-21-methyl-$\Delta^{4,6}$-pregnadiene-16α,17α-diol-3,11,20,21-tetrone 9α-bromo-21-methyl-$\Delta^{4,6}$-pregnadiene-16α,17α-diol-3,11,20,21-tetrone 9α-iodo-21-methyl-$\Delta^{4,6}$-pregnadiene-16α,17α-diol-3,11,20,21-tetrone 9α-methoxy-21-methyl-$\Delta^{4,6}$-pregnadiene-16α,17α-diol-3,11,20,21-tetrone 9α-ethoxy-21-methyl-$\Delta^{4,6}$-pregnadiene-16α,17α-diol-3,11,20,21-tetrone 16α,21-dimethyl-$\Delta^{4,6}$-pregnadiene-11β,17α-diol-3,20,21-trione 16α,21-dimethyl-9α-fluoro-$\Delta^{4,6}$-pregnadiene-11β,17α-diol-3,20,21-trione 16α,21-dimethyl-9α-chloro-$\Delta^{4,6}$-pregnadiene-11β,17α-diol-3,20,21-trione 16α,21-dimethyl-9α-bromo-$\Delta^{4,6}$-pregnadiene-11β,17α-diol-3,20,21-trione 16α,21-dimethyl-9α-iodo-$\Delta^{4,6}$-pregnadiene-11β,17α-diol-3,20,21-trione 16α,21-dimethyl-9α-methoxy-$\Delta^{4,6}$-pregnadiene-11β,17α-diol-3,20,21-trione 16α,21-dimethyl-9α-ethoxy-$\Delta^{4,6}$-pregnadiene-11β,17α-diol-3,20,21-trione 16α,21-dimethyl-$\Delta^{4,6}$-pregnadiene-17α-ol-3,11,20,21-tetrone 16α,21-dimethyl-9α-fluoro-$\Delta^{4,6}$-pregnadiene-17α-ol-3,11,20,21-tetrone 16α,21-dimethyl-9α-chloro-$\Delta^{4,6}$-pregnadiene-17α-ol-3,11,20,21-tetrone 16α,21-dimethyl-9α-bromo-$\Delta^{4,6}$-pregnadiene-17α-ol-3,11,20,21-tetrone 16α,21-dimethyl-9α-iodo-$\Delta^{4,6}$-pregnadiene-17α-ol-3,11,20,21-tetrone 16α,21-dimethyl-9α-methoxy-$\Delta^{4,6}$-pregnadiene-17α-ol-3,11,20,21-tetrone 16α,21-dimethyl-9α-ethoxy-$\Delta^{4,6}$-pregnadiene-17α-ol-3,11,20,21-tetrone 9α-fluoro-21-methyl-$\Delta^{1,4,6}$-pregnatriene-11β,17α-diol-3,20,21-trione 9α-chloro-21-methyl-$\Delta^{1,4,6}$-pregnatriene-11β,17α-diol-3,20,21-trione 9α-bromo-21-methyl-$\Delta^{1,4,6}$-pregnatriene-11β,17α-diol-3,20,21-trione 9α-iodo-21-methyl-$\Delta^{1,4,6}$-pregnatriene-11β,17α-diol-3,20,21-trione 9α-methoxy-21-methyl-$\Delta^{1,4,6}$-pregnatriene-11β,17α-diol-3,20,21-trione 9α-ethoxy-21-methyl-$\Delta^{1,4,6}$-pregnatriene-11β,17α-diol-3,20,21-trione 21-methyl-$\Delta^{1,4,6}$-pregnatriene-17α-ol-3,11,20,21-tetrone 9α-fluoro-21-methyl-$\Delta^{1,4,6}$-pregnatriene-17α-ol-3,11,20,21-tetrone 9α-chloro-21-methyl-$\Delta^{1,4,6}$-pregnatriene-17α-ol-3,11,20,21-tetrone 9α-bromo-21-methyl-$\Delta^{1,4,6}$-pregnatriene-17α-ol-3,11,20,21-tetrone 9α-iodo-21-methyl-$\Delta^{1,4,6}$-pregnatriene-17α-ol-3,11,20,21-tetrone 9α-methoxy-21-methyl-$\Delta^{1,4,6}$-pregnatriene-17α-ol-3,11,20,21-tetrone 9α-ethoxy-21-methyl-$\Delta^{1,4,6}$-pregnatriene-17α-ol-3,11,20,21-tetrone 2,21-methyl-$\Delta^{1,4,6}$-pregnatriene-17α-ol-3,20,21-trione 9α-fluoro-21-methyl-$\Delta^{1,4,6}$-pregnatriene-17α-ol-3,20,21-trione 9α-chloro-21-methyl-$\Delta^{1,4,6}$-pregnatriene-17α-ol-3,20,21-trione 9α-bromo-21-methyl-$\Delta^{1,4,6}$-pregnatriene-17α-ol-3,20,21-trione 9α-iodo-21-methyl-$\Delta^{1,4,6}$-pregnatriene-17α-ol-3,20,21-trione 9α-methoxy-21-methyl-$\Delta^{1,4,6}$-pregnatriene-17α-ol-3,20,21-trione 9α-ethoxy-21-methyl-$\Delta^{1,4,6}$-pregnatriene-17α-ol-3,20,21-trione 2,21-dimethyl-$\Delta^{1,4,6}$-pregnatriene-3,11,20,21-tetrone 2,21-dimethyl-9α-fluoro-$\Delta^{1,4,6}$-pregnatriene-3,11,20,21-tetrone 2,21-dimethyl-9α-chloro-$\Delta^{1,4,6}$-pregnatriene-3,11,20,21-tetrone 2,21-dimethyl-9α-bromo-$\Delta^{1,4,6}$-pregnatriene-3,11,20,21-tetrone 2,21-dimethyl-9α-iodo-$\Delta^{1,4,6}$-pregnatriene-3,11,20,21-tetrone 2,21-dimethyl-9α-methoxy-$\Delta^{1,4,6}$-pregnatriene-3,11,20,21-tetrone 2,21-dimethyl-9α-ethoxy-$\Delta^{1,4,6}$-pregnatriene-3,11,20,21-tetrone 6,21-dimethyl-$\Delta^{1,4,6}$-pregnatriene-11β,17α-diol-3,20,21-trione 6,21-dimethyl-9α-fluoro-$\Delta^{1,4,6}$-pregnatriene-11β,17α-diol-3,20,21-trione 6,21-dimethyl-9α-chloro-$\Delta^{1,4,6}$-pregnatriene-11β,17α-diol-3,20,21-trione 6,21-dimethyl-9α-bromo-$\Delta^{1,4,6}$-pregnatriene-11β,17α-diol-3,20,21-trione 6,21-dimethyl-9α-iodo-$\Delta^{1,4,6}$-pregnatriene-11β,17α-diol-3,20,21-trione 6,21-dimethyl-9α-methoxy-$\Delta^{1,4,6}$-pregnatriene-11β,17α-diol-3,20,21-trione 6,21-dimethyl-9α-ethoxy-$\Delta^{1,4,6}$-pregnatriene-11β,17α-diol-3,20,21-trione 6,21-dimethyl-$\Delta^{1,4,6}$-pregnatriene-17α-ol-3,11,20,21-tetrone 6,21-dimethyl-9α-fluoro-$\Delta^{1,4,6}$-pregnatriene-17α-ol-3,11,20,21-tetrone 6,21-dimethyl-9α-chloro-$\Delta^{1,4,6}$-pregnatriene-17α-ol-3,11,20,21-tetrone 6,21-dimethyl-9α-bromo-$\Delta^{1,4,6}$-pregnatriene-17α-ol-3,11,20,21-tetrone 6,21-dimethyl-9α-iodo-$\Delta^{1,4,6}$-pregnatriene-17α-ol-3,11,20,21-tetrone 6,21-dimethyl-9α-methoxy-$\Delta^{1,4,6}$-pregnatriene-17α-ol-3,11,20,21-tetrone 6,21-dimethyl-9α-ethoxy-$\Delta^{1,4,6}$-pregnatriene-17α-ol-3,11,20,21-tetrone 21-methyl-$\Delta^{1,4,6}$-pregnatriene-11β,14α,17α-triol-3,20,21-trione 9α - fluoro - 21-methyl-$\Delta^{1,4,6}$-pregnatriene-11β,14α,17α-triol-3,20,21-trione 9α-chloro-21-methyl-$\Delta^{1,4,6}$-pregnatriene-11β,14α,17α-triol-3,20,21-trione 9α - bromo - 21-methyl-$\Delta^{1,4,6}$-pregnatriene-11β,14α,17α-triol-3,20,21-trione 9α-iodo-21-methyl-$\Delta^{1,4,6}$-pregnatriene-11β,14α,17α-triol-3,20,21-trione 9α-methoxy-21-methyl-$\Delta^{1,4,6}$-pregnatriene-11β,14α,17α-triol-3,20,21-trione 9α-ethoxy-21-methyl-$\Delta^{1,4,6}$-pregnatriene-11β,14α,17α-triol-3,20,21-trione 21-methyl-$\Delta^{1,4,6}$-pregnatriene-14α,17α-diol-3,11,20,21-tetrone 9α-fluoro-21-methyl-$\Delta^{1,4,6}$-pregnatriene-14α,17α-diol-3,11,20,21-tetrone 9α-chloro-21-methyl-$\Delta^{1,4,6}$-pregnatriene-14α,17α-diol-3,11,20,21-tetrone 9α-bromo-21-methyl-$\Delta^{1,4,6}$-pregnatriene-14α,17α-diol-3,11,20,21-tetrone 9α-iodo-21-methyl-$\Delta^{1,4,6}$-pregnatriene-14α,17α-diol-3,11,20,21-tetrone 9α-methoxy-21-methyl-$\Delta^{1,4,6}$-pregnatriene-14α,17α-diol-3,11,20,21-tetrone 9α-ethoxy-21-methyl-$\Delta^{1,4,6}$-pregnatriene-14α,17α-diol-3,11,20,21-tetrone 21-methyl-$\Delta^{1,4,6}$-pregnatriene-11β,16α,17α-triol-3,20,21-trione 9α-fluoro-21-methyl-$\Delta^{1,4,6}$-pregnatriene-11β,16α,17α-triol-3,20,21-trione 9α-chloro-21-methyl-$\Delta^{1,4,6}$-pregnatriene-11β,16α,17α-triol-3,20,21-trione 9α-bromo-21-methyl-$\Delta^{1,4,6}$-pregnatriene-11β,16α,17α-triol-3,20,21-trione 9α-iodo-21-methyl-$\Delta^{1,4,6}$-pregnatriene-11β,16α,17α-triol-3,20,21-trione 9α-methoxy-21-methyl-$\Delta^{1,4,6}$-pregnatriene-11β,16α,17α-triol-3,20,21-trione 9α-ethoxy-21-methyl-$\Delta^{1,4,6}$-pregnatriene-11β,16α,17α-triol-3,20,21-trione 21-methyl-$\Delta^{1,4,6}$-pregnatriene-16α,17α-diol-3,11,20,21-tetrone 9α-fluoro-21-methyl-$\Delta^{1,4,6}$-pregnatriene-16α,17α-diol-3,11,20,21-tetrone 9α-chloro-21-methyl-$\Delta^{1,4,6}$-pregnatriene-16α,17α-diol-3,11,20,21-tetrone 9α-bromo-21-methyl-$\Delta^{1,4,6}$-pregnatriene-16α,17α-diol-3,11,20,21-tetrone 9α-iodo-21-methyl-$\Delta^{1,4,6}$-pregnatriene-16α,17α-diol-3,11,20,21-tetrone 9α-methoxy-21-methyl-$\Delta^{1,4,6}$-pregnatriene-16α,17α-diol-3,11,20,21-tetrone 9α-ethoxy-21-methyl-$\Delta^{1,4,6}$-pregnatriene-16α,17α-diol-3,11,20,21-tetrone 16α,21-dimethyl-$\Delta^{1,4,6}$-pregnatriene-11β,17α-diol-3,20,21-trione 16α,21-dimethyl-9α-fluoro-$\Delta^{1,4,6}$-pregnatriene-11β,17α-diol-3,20,21-trione 16,α,21-dimethyl-9α-chloro-$\Delta^{1,4,6}$-pregnatriene-11β,17α-diol-3,20,21-trione 16α,21-dimethyl-9α-bromo-$\Delta^{1,4,6}$-pregnatriene-11β,17α-diol-3,20,21-trione 16α,21-dimethyl-9α-iodo-$\Delta^{1,4,6}$-pregnatriene-11β,17α-diol-3,20,21-trione 16α,21-dimethyl-9α-methoxy-$\Delta^{1,4,6}$-pregnatriene-11β,17α-diol-3,20,21-trione 16α,21-dimethyl-9α-ethoxy-$\Delta^{1,4,6}$-pregnatriene-11β,17α-diol-3,20,21-trione 16α,21-dimethyl-$\Delta^{1,4,6}$-pregnatriene-17α-ol-3,11,20,21-tetrone 16α,21-dimethyl-9α-fluoro-$\Delta^{1,4,6}$-pregnatriene-17α-ol-3,11,20,21-tetrone 16α,21-dimethyl-9α-chloro-$\Delta^{1,4,6}$-pregnatriene-17α-ol-3,11,20,21-tetrone 16α,21-dimethyl-9α-bromo-$\Delta^{1,4,6}$-pregnatriene-17α-ol-3,11,20,21-tetrone 16α,21-dimethyl-9α-iodo-$\Delta^{1,4,6}$-pregnatriene-17α-ol-3,11,20,21-tetrone 16α,21-dimethyl-9α-methoxy-$\Delta^{1,4,6}$-pregnatriene-17α-ol-3,11,20,21-tetrone 16α,21-dimethyl-9α-ethoxy-$\Delta^{1,4,6}$-pregnatriene-17α-ol-3,11,20,21-tetrone 16-methylene-9α-fluoro-21-methyl-$\Delta^{4}$-pregnene-11β,17α-diol-3,20,21-trione 16-methylene-9α-chloro-21-methyl-$\Delta^{4}$-pregnene-11β,17α-diol-3,20,21-trione 16-methylene-9α-bromo-21-methyl-$\Delta^{4}$-pregnene-11β,17α-diol-3,20,21-trione 16-methylene-9α-iodo-21-methyl-$\Delta^{4}$-pregnene-11β,17α-diol-3,20,21-trione 16-methylene-9α-methoxy-21-methyl-$\Delta^{4}$-pregnene-11β,17α-diol-3,20,21-trione 16-methylene-9α-ethoxy-21-methyl-$\Delta^{4}$-pregnene-11β,17α-diol-3,20,21-trione 16-methylene-9α-fluoro-21-methyl-$\Delta^{4}$-pregnene-17α-ol-3,11,20,21-tetrone 16-methylene-9α-chloro-21-methyl-$\Delta^{4}$-pregnene-17α-ol-3,11,20,21-tetrone 16-methylene-9α-bromo-21-methyl-$\Delta^{4}$-pregnene-17α-ol-3,11,20,21-tetrone 16-methylene-9α-iodo-21-methyl-$\Delta^{4}$-pregnene-17α-ol-3,11,20,21-tetrone 16-methylene-9α-methoxy-21-methyl-$\Delta^{4}$-pregnene-17α-ol-3,11,20,21-tetrone 16-methylene-9α-ethoxy-21-methyl-$\Delta^{4}$-pregnene-17α-ol-3,11,20,21-tetrone 16-methylene-9α-fluoro-21-methyl-$\Delta^{1,4}$-pregnadiene-11β,17α-diol-3,20,21-trione 16-methylene-9α-chloro-21-methyl-$\Delta^{1,4}$-pregnadiene-11β,17α-diol-3,20,21-trione 16-methylene-9α-bromo-21-methyl-$\Delta^{1,4}$-pregnadiene-11β,17α-diol-3,20,21-trione 16-methylene-9α-iodo-21-methyl-$\Delta^{1,4}$-pregnadiene-11β,17α-diol-3,20,21-trione 16-methylene-9α-methoxy-21-methyl-$\Delta^{1,4}$-pregnadiene-11β,17α-diol-3,20,21-trione 16-methylene-9α-ethoxy-21-methyl-$\Delta^{1,4}$-pregnadiene-11β,17α-diol-3,20,21-trione 16-methylene-21-methyl-$\Delta^{1,4}$-pregnadiene-17α-ol-3,11,20-21-tetrone 16-methylene-9α-fluoro-21-methyl-$\Delta^{1,4}$-pregnadiene-17α-ol-3,11,20,21-tetrone 16-methylene-9α-chloro-21-methyl-$\Delta^{1,4}$-pregnadiene-17α-ol-3,11,20,21-tetrone 16-methylene-9α-iodo-21-methyl-$\Delta^{1,4}$-pregnadiene-17α-ol-3,11,20,21-tetrone 16-methylene-9α-methoxy-21-methyl-$\Delta^{1,4}$-pregnadiene-17α-ol-3,11,20,21-tetrone 16-methylene-9α-ethoxy-21-methyl-$\Delta^{1,4}$-pregnadiene-17α-ol-3,11,20,21-tetrone 16-methylene-21-methyl-$\Delta^{4,6}$-pregnadiene-11β,17α-ol-3,20,21-trione 16-methylene-9α-fluoro-21-methyl-$\Delta^{4,6}$-pregnadiene-11β,17α-ol-3,20,21-trione 16-methylene-9α-chloro-21-methyl-$\Delta^{4,6}$-pregnadiene-11β,17α-ol-3,20,21-trione 16-methylene-9α-bromo-21-methyl-$\Delta^{4,6}$-pregnadiene-11β,17α-ol-3,20,21-trione 16-methylene-9α-iodo-21-methyl-$\Delta^{4,6}$-pregnadiene-11β,17α-ol-3,20,21-trione 16-methylene-9α-methoxy-21-methyl-$\Delta^{4,6}$-pregnadiene-11β,17α-ol-3,20,21-trione
16-methylene-9α-ethoxy-21-methyl-$\Delta^{4,6}$-pregnadiene-11β,17α-ol-3,20,21-trione
16-methylene-21-methyl-$\Delta^{4,6}$-pregnadiene-17α-ol-3,11,20,21-tetrone
16-methylene-9α-fluoro-21-methyl-$\Delta^{4,6}$-pregnadiene-17α-ol-3,11,20,21-tetrone
16-methylene-9α-chloro-21-methyl-$\Delta^{4,6}$-pregnadiene-17α-ol-3,11,20,21-tetrone
16,methylene-9α-bromo-21-methyl-$\Delta^{4,6}$-pregnadiene-17α-ol-3,11,20,21-tetrone
16-methylene-9α-iodo-21-methyl-$\Delta^{4,6}$-pregnadiene-17α-ol-3,11,20,21-tetrone
16-methylene-9α-methoxy-21-methyl-$\Delta^{4,6}$-pregnadiene-17α-ol-3,11,20,21-tetrone
16-methylene-9α-ethoxy-21-methyl-$\Delta^{4,6}$-pregnadiene-17α-ol-3,11,20,21-tetrone
16-methylene-9α-fluoro-21-methyl-$\Delta^{1,4,6}$-pregnatriene-11β,17α-diol-3,20,21-trione
16-methylene-9α-chloro-21-methyl-$\Delta^{1,4,6}$-pregnatriene-11β,17α-diol-3,20,21-trione
16-methylene-9α-bromo-21-methyl-$\Delta^{1,4,6}$-pregnatriene-11β,17αdiol-3,20,21-trione
16-methylene-9α-iodo-21-methyl-$\Delta^{1,4,6}$-pregnatriene-11β,17α-diol-3,20,21-trione
16-methylene-9α-methoxy-21-methyl-$\Delta^{1,4,6}$-pregnatriene-11β,17α-diol-3,20,21-trione
16-methylene-9α-ethoxy-21-methyl-$\Delta^{1,4,6}$-pregnatriene-11β,17α-diol-3,20,21-trione
16-methylene-21-methyl-$\Delta^{1,4,6}$-pregnatriene-17α-ol-3,11,20,21-tetrone
16-methylene-9α-fluoro-21-methyl-$\Delta^{1,4,6}$-pregnatriene-17α-ol-3,11,20,21-tetrone
16-methylene-9α-chloro-21-methyl-$\Delta^{1,4,6}$-pregnatriene-17α-ol-3,11,20,21-tetrone
16-methylene-9α-bromo-21-methyl-$\Delta^{1,4,6}$-pregnatriene-17α-ol-3,11,20,21-tetrone
16-methylene-9α-iodo-21-methyl-$\Delta^{1,4,6}$-pregnatriene-17α-ol-3,11,20,21-tetrone
16-methylene-9α-methoxy-21-methyl-$\Delta^{1,4,6}$-pregnatriene-17α-ol-3,11,20,21-tetrone
16-methylene-9α-ethoxy-21-methyl-$\Delta^{1,4,6}$-pregnatriene-17α-ol-3,11,20,21-tetrone
9α,16α-difluoro-21-methyl-$\Delta^{4}$-pregnene-11β,17α-diol-3,20,21-trione
16α-fluoro-9α-chloro-21-methyl-$\Delta^{4}$-pregnene-11β,17α-diol-3,20,21-trione
16α-fluoro-9α-bromo-21-methyl-$\Delta^{4}$-pregnene-11β,17α-diol-3,20,21-trione
16α-fluoro-9α-iodo-21-methyl-$\Delta^{4}$-pregnene-11β,17α-diol-3,20,21-trione
16α-fluoro-9α-methoxy-21-methyl-$\Delta^{4}$-pregnene-11β,17α-diol-3,20,21-trione
16α-fluoro-9α-ethoxy-21-methyl-$\Delta^{4}$-pregnene-11β,17α-diol-3,20,21-trione
9α,16α-difluoro-21-methyl-$\Delta^{4}$-pregnene-17α-ol-3,11,20,21-tetrone
16α-fluoro-9α-chloro-21-methyl-$\Delta^{4}$-pregnene-17α-ol-3,11,20,21-tetrone
16α-fluoro-9α-bromo-21-methyl-$\Delta^{4}$-pregnene-17α-ol-3,11,20,21-tetrone
16α-fluoro-9α-iodo-21-methyl-$\Delta^{4}$-pregnene-17α-ol-3,11,20,21-tetrone
16α-fluoro-9α-methoxy-21-methyl-$\Delta^{4}$-pregnene-17α-ol-3,11,20,21-tetrone
16α-fluoro-9α-ethoxy-21-methyl-$\Delta^{4}$-pregnene-17α-ol-3,11,20,21-tetrone
9α,16α-difluoro-21-methyl-$\Delta^{1,4}$-pregnadiene-11β,17α-diol-3,20,21-trione
16α-fluoro-9α-chloro-21-methyl-$\Delta^{1,4}$-pregnadiene-11β,17α-diol-3,20,21-trione
16α-fluoro-9α-bromo-21-methyl-$\Delta^{1,4}$-pregnadiene-11β,17α-diol-3,20,21-trione
16α-fluoro-9α-iodo-21-methyl-$\Delta^{1,4}$-pregnadiene-11β,17α-diol-3,20,21-trione
16α-fluoro-9α-methoxy-21-methyl-$\Delta^{1,4}$-pregnadiene-11β,17α-diol-3,20,21-trione
16α-fluoro-9α-ethoxy-21-methyl-$\Delta^{1,4}$-pregnadiene-11β,17α-diol-3,20,21-trione
16α-fluoro-21-methyl-$\Delta^{1,4}$-pregnadiene-17α-ol-3,11,20,21-tetrone
9α,16α-difluoro-21-methyl-$\Delta^{1,4}$-pregnadiene-17α-ol-3,11,20,21-tetrone
16α-fluoro-9α-chloro-21-methyl-$\Delta^{1,4}$-pregnadiene-17α-ol-3,11,20,21-tetrone
16α-fluoro-9α-bromo-21-methyl-$\Delta^{1,4}$-pregnadiene-17α-ol-3,11,20,21-tetrone
16α-fluoro-9α-iodo-21-methyl-$\Delta^{1,4}$-pregnadiene-17α-ol-3,11,20,21-tetrone
16α-fluoro-9α-methoxy-21-methyl-$\Delta^{1,4}$-pregnadiene-17α-ol-3,11,20,21-tetrone
16α-fluoro-9α-ethoxy-21-methyl-$\Delta^{1,4}$-pregnadiene-17α-ol-3,11,20,21-tetrone
16α-fluoro-21-methyl-$\Delta^{4,6}$-pregnadiene-11β,17α-ol-3,20,21-trione
9α,16α-difluoro-21-methyl-$\Delta^{4,6}$-pregnadiene-11β,17α-ol-3,20,21-trione
16α-fluoro-9α-chloro-21-methyl-$\Delta^{4,6}$-pregnadiene-11β,17α-ol-3,20,21-trione
16α-fluoro-9α-bromo-21-methyl-$\Delta^{4,6}$-pregnadiene-11β,17α-ol-3,20,21-trione
16α-fluoro-9α-iodo-21-methyl-$\Delta^{4,6}$-pregnadiene-11β,17α-ol-3,20,21-trione
16α-fluoro-9α-methoxy-21-methyl-$\Delta^{4,6}$-pregnadiene-11β,17α-ol-3,20,21-trione
16α-fluoro-9α-ethoxy-21-methyl-$\Delta^{4,6}$-pregnadiene-11β,17α-ol-3,20,21-trione
16α-fluoro-21-methyl-$\Delta^{4,6}$-pregnadiene-17α-ol-3,11,20,21 tetrone
9α,16α-difluoro-21-methyl-$\Delta^{4,6}$-pregnadiene-17α-ol-3,11,20,21-tetrone
16α-fluoro-9α-chloro-21-methyl-$\Delta^{4,6}$-pregnadiene-17α-ol-3,11,20,21-tetrone
16α-fluoro-9α-bromo-21-methyl-$\Delta^{4,6}$-pregnadiene-17α-ol-3,11,20,21-tetrone
16α-fluoro-9α-iodo-21-methyl-$\Delta^{4,6}$-pregnadiene-17α-ol-3,11,20,21-tetrone
16α-fluoro-9α-methoxy-21-methyl-$\Delta^{4,6}$-pregnadiene-17α-ol-3,11,20,21-tetrone
16α-fluoro-9α-ethoxy-21-methyl-$\Delta^{4,6}$-pregnadiene-17α-ol-3,11,20,21-tetrone
9α,16α-difluoro-21-methyl-$\Delta^{1,4,6}$-pregnatriene-11β,17α-diol-3,20,21-trione
16α-fluoro-9α-chloro-21-methyl-$\Delta^{1,4,6}$-pregnatriene-11β,17α-diol-3,20,21-trione
16α-fluoro-9α-bromo-21-methyl-$\Delta^{1,4,6}$-pregnatriene-11β,17α-diol-3,20,21-trione
16α-fluoro-9α-iodo-21-methyl-$\Delta^{1,4,6}$-pregnatriene-11β,17α-diol-3,20,21-trione
16α-fluoro-9α-methoxy-21-methyl-$\Delta^{1,4,6}$-pregnatriene-11β,17α-diol-3,20,21-trione
16α-fluoro-9α-ethoxy-21-methyl-$\Delta^{1,4,6}$-pregnatriene-11β,17α-diol-3,20,21-trione
16α-fluoro-21-methyl-$\Delta^{1,4,6}$-pregnatriene-17α-ol-3,11,20,21-tetrone
9α-16α-difluoro-21-methyl-$\Delta^{1,4,6}$-pregnatriene-17α-ol-3,11,20,21-tetrone
16α-fluoro-9α-chloro-21-methyl-$\Delta^{1,4,6}$-pregnatriene-17α-ol-3,11,20,21-tetrone
16α-fluoro-9α-bromo-21-methyl-$\Delta^{1,4,6}$-pregnatriene-17α-ol-3,11,20,21-tetrone
16α-fluoro-9α-iodo-21-methyl-$\Delta^{1,4,6}$-pregnatriene-17α-ol-3,11,20,21-tetrone
16α-fluoro-9α-methoxy-21-methyl-$\Delta^{1,4,6}$-pregnatriene-17α-ol-3,11,20,21-tetrone 16α-fluoro-9α-ethoxy-21-methyl$\Delta^{1,4,6}$-pregnatriene-17α-ol-3,11,20,21-tetrone 6α-chloro-9α-fluoro-21-methyl-$\Delta^{4}$-pregnene-11β,17α-diol-3,20,21-trione 6α,9α-dichloro-9α-chloro-21-methyl-$\Delta^{4}$-pregnene-11β,17α-diol-3,20,21-trione 6α-chloro-9α-bromo-21-methyl-$\Delta^{4}$-pregnene-11β,17α-diol-3,20,21-trione 6α-chloro-9α-iodo-21-methyl-$\Delta^{4}$-pregnene-11β,17α-diol-3,20,21-trione 6α-chloro-9α-methoxy-21-methyl-$\Delta^{4}$-pregnene-11β,17α-diol-3,20,21-trione 6α-chloro-9α-ethoxy-21-methyl-$\Delta^{4}$-pregnene-11β,17α-diol-3,20,21-trione A variety of esters of the foregoing 16-hydroxylated compounds were prepared in accordance with standard esterification precedures. The esters prepared include the formates, acetates, propionates, propenoates, butyrates, decanoates, benzoates, citrates, cyclohexanoates and acid esters such as hemisuccinates and hemiglutarates.

Alkali and alkaline metal salts of the acid esters are prepared by reaction of the said acid esters with the hydroxides or carbonates of the selected metal in accordance with standard procedures. These products have the advantage of increased solubility in water compared to the other compounds of this invention.

What is claimed is:

1. A compound selected from the group consisting of those having the structural formulas

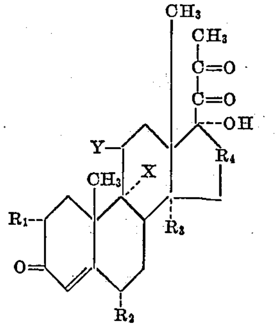

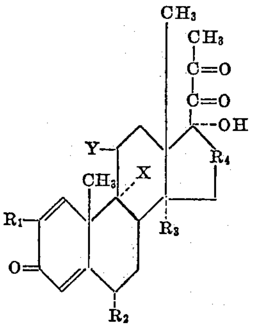

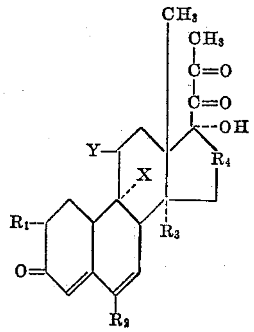

and

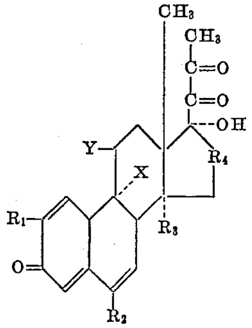

wherein $R_1$ is selected from the group consisting of hydrogen and methyl; $R_2$ is selected from the group consisting of hydrogen, fluorine, chlorine and methyl; $R_3$ is selected from the group consisting of hydrogen and hydroxyl; $R_4$ is selected from the group consisting of

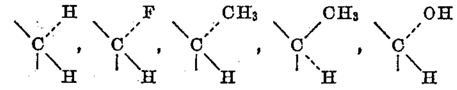

and

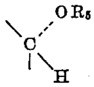

$R_5$ is selected from the group consisting of acyl containing only carbon, hydrogen and oxygen and derived from mono- and dicarboxylic acids containing up to ten carbon atoms, and the alkali metal and alkaline earth metal salts of those acyl moieties that are derived from the said dicarboxylic acids; X is selected from the group consisting of hydrogen, α-halogen, α-methoxy and α-ethoxy; and Y is selected from the group consisting of keto and β-hydroxyl; at least three of $R_1$, $R_2$, $R_3$ and the second substituent on the number 16 carbon atom always being hydrogen.

2. A pharmaceutical composition comprising a compound as claimed in claim 1 together with a pharmaceutically acceptable carrier.

3. A process for the preparation of a compound as claimed in claim 1 which comprises contacting a compound represented by the formula:

R—Z wherein R is a cyclopentanopolyhydrophenanthrene nucleus characterized by adrenocortical activity when substituted at the 17β-position with an α-hydroxy acetyl group and Z is an α-hydroxy-β-chloro-propanoyl group with bismuth trioxide at a temperature of from 50° C. to 60° C. in a lower oxygenated aliphatic solvent for a period of from about 2½ to about 4 hours.

References Cited in the file of this patent

UNITED STATES PATENTS 2,268,084 Reichstein ............. Dec. 30, 1941